United States Patent [19]

Mathues

[11] 3,964,795
[45] June 22, 1976

[54] MODULAR PROPORTIONER

[75] Inventor: Thomas P. Mathues, Miamisburg, Ohio

[73] Assignee: General Motors Corporation, Detroit, Mich.

[22] Filed: Aug. 25, 1975

[21] Appl. No.: 607,200

[52] U.S. Cl. .................. 303/6 C; 188/151 A; 188/349; 303/84 R
[51] Int. Cl.² ........................................ B60T 8/26
[58] Field of Search .................. 303/6 C, 6 R, 84; 200/82 D; 340/52 C; 188/151 A, 349

[56] References Cited
UNITED STATES PATENTS

| | | | |
|---|---|---|---|
| 3,480,333 | 11/1969 | Stelzer | 303/6 C |
| 3,637,963 | 1/1972 | Wellman | 303/6 C |
| 3,661,426 | 5/1972 | Tam | 303/6 C |
| 3,686,864 | 8/1972 | Shutt | 303/6 C |
| 3,695,730 | 10/1972 | Ayers, Jr. | 303/6 C |
| 3,733,106 | 5/1973 | Rike et al. | 303/6 C |

Primary Examiner—Trygve M. Blix
Assistant Examiner—Douglas C. Butler
Attorney, Agent, or Firm—D. D. McGraw

[57] ABSTRACT

A combination proportioner and a shuttle piston which when moved actuates a brake pressure loss warning switch. A proportioner piston has a spring preload which must be overcome by rear brake supply pressure before the proportioner is actuated. Upon brake release the lips of the switch actuating piston proportioner seal act as a valve to relieve rear brake pressure to the pressure at which the proportioner began to operate. The proportioner is deactivated upon front brake system pressure loss. The proportioner mechanism is so assembled that it can be utilized as an original installation or as a replacement module. In an installation where no proportioning action is required, the shuttle piston and head nut are installed without a proportioning valve. When a proportioning valve is required, a head nut with the proportioning mechanism preassembled therein is installed.

2 Claims, 2 Drawing Figures

MODULAR PROPORTIONER

The invention relates to a warning switch actuating piston and a brake pressure proportioner assembly in which the proportioner is preassembled in a head nut. The switch actuating piston may be utilized with or without the proportioner. The proportioner may be replaced as a module by removing the head nut in which it is preassembled and installing another preassembled unit.

It is a primary object of the invention to provide a brake pressure proportioner valve assembly adapted for removal and replacement in a housing as a preassembled unit in carrying out the invention. Such an assembly preferably includes a proportioner support member which has means for attaching and removing the assembly relative to a housing. The assembly includes a pressure outlet, a proportioner piston preassembled in the support member and formed to provide a proportioner valve element and differential areas responsive to brake fluid pressures for proportioning action, a proportioner valve seat secured to and preassembled in the first member for coaction with the proportioner valve element to define a proportioner valve, a proportioner piston spring resisting closing of the proportioner valve to establish a minimum pressure at which proportioning operation begins, and a brake inlet passage adapted to receive brake pressure to be proportioned. The inlet passage is in continuous fluid communication with one side of the proportioner valve and with the smaller of the proportioner piston differential areas. The pressure outlet is in continuous fluid communication with the other side of the proportioner valve and the larger of the proportioner piston differential areas so that brake pressure above a predetermined value in the inlet is proportioned to a lesser value at the outlet.

Figure 1:
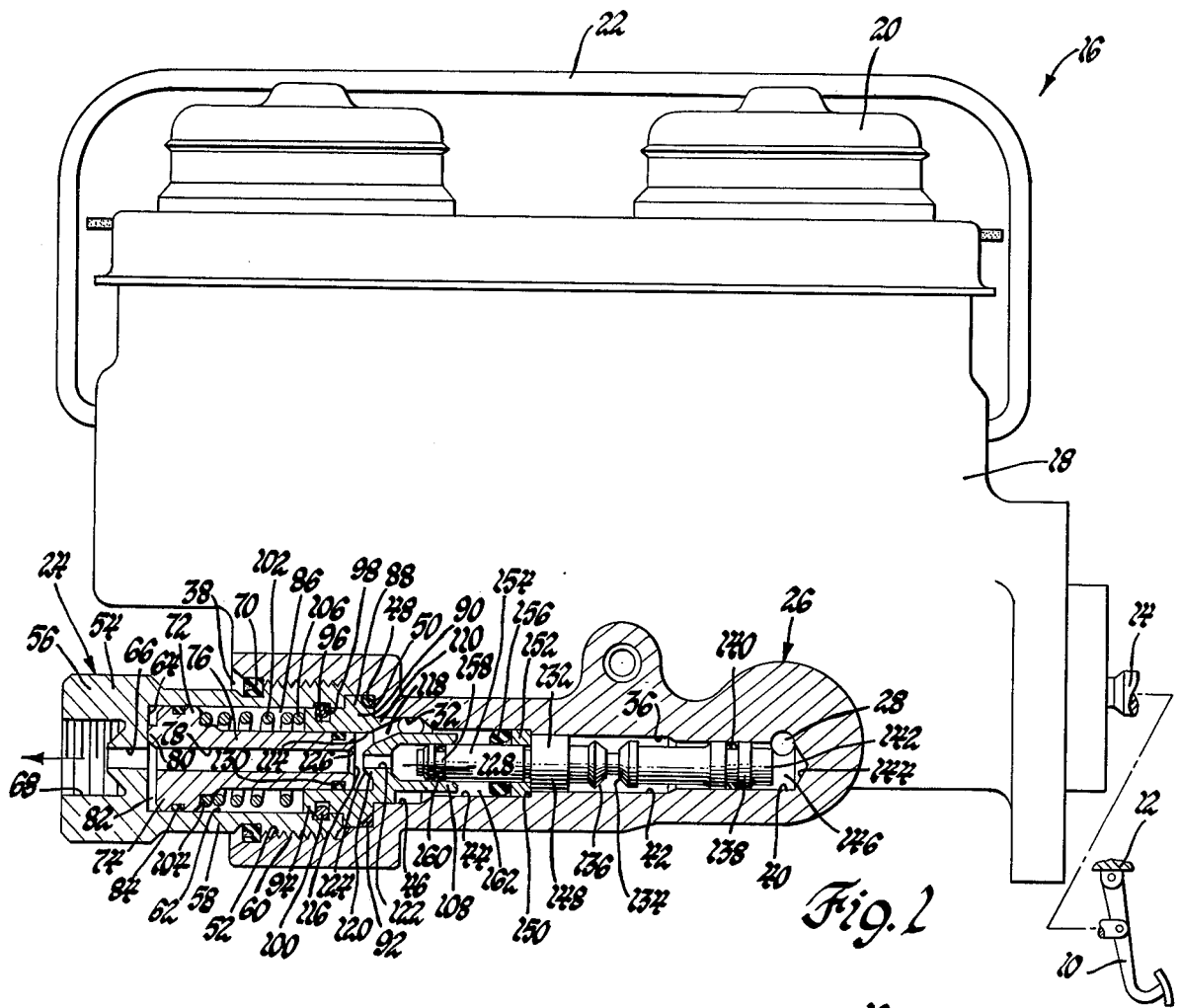
FIG. 1 is an elevation view of an assembly embodying the invention with parts broken away and in section.
Figure 2:
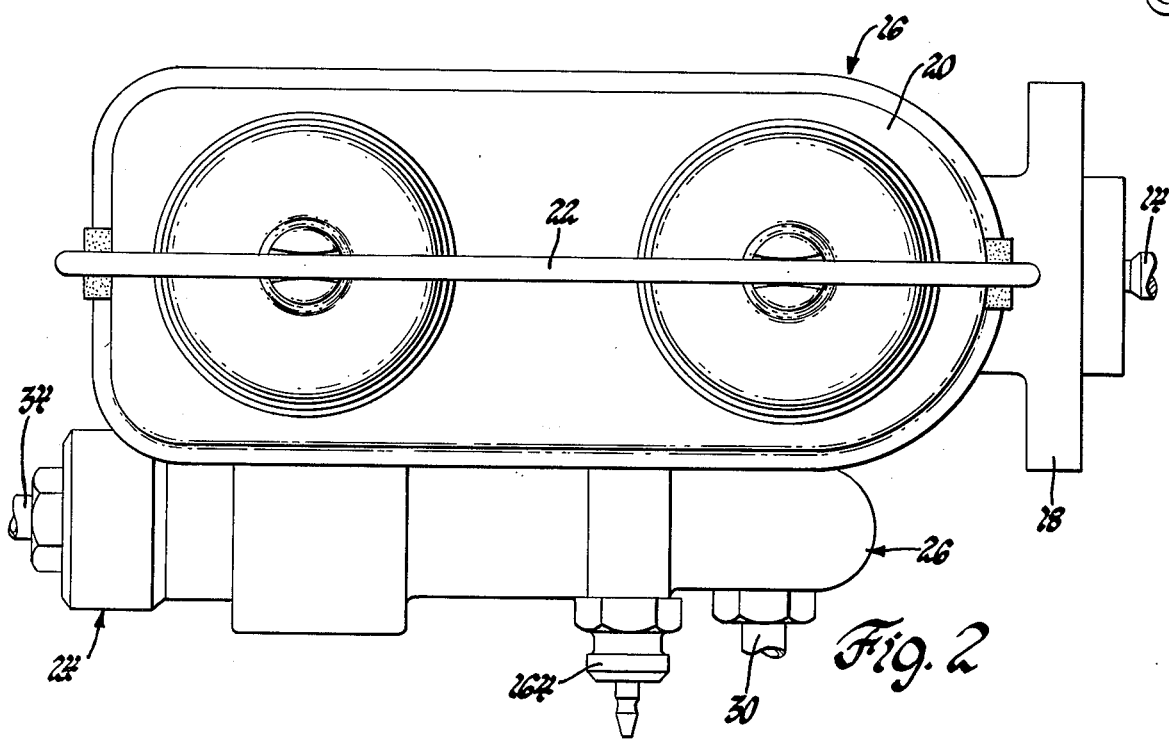
FIG. 2 is a plan view of the assembly of FIG. 1, with parts broken away.

The assembly illustrated in the drawing is shown somewhat schematically in a vehicle brake system. The vehicle brake pedal 10 is suitably pivoted to a portion 12 of the vehicle and is connected through a push rod 14 to a master cylinder assembly 16. This assembly includes a housing 18 containing a tandem master cylinder arrangement of any suitable well known type in which two pressurizing chambers are provided to deliver brake pressures to two brake circuits. The housing is covered by a suitable cover 20 held in place by a retainer 22. In the particular arrangement illustrated the modular proportioner assembly 24 includes a housing 26 which is either integrally formed with or securely attached to the master cylinder housing 18 so that pressures generated in the pressurizing chambers of the master cylinder are directly connected thereto. The brake circuits normally connected to this arrangement include one for vehicle front brakes and another for vehicle rear brakes. The port 28 is provided to communicate front brake supply pressure from one master cylinder pressurizing chamber through the housing 26 and to the front brake fluid outlet conduit 30. The port 32 communicates rear brake supply pressure from the other master cylinder pressurizing chamber to an appropriate passage in housing 26. This pressure passes through the proportioning valve of assembly 24, where it may or may not have a proportioning operation performed on it, and is then connected to pass, as rear brake actuating pressure, to the rear brakes through the rear brake fluid outlet conduit 34.

The housing 26 is provided with a stepped bore 36 open at one end 38. The stepped bore has a smallest bore section 40 in the closed end of which port 28 is connected, a next larger bore section 42, a still larger bore section 44, a yet larger bore section 46 into which port 32 opens, a shoulder 48 connecting bore section 46 with an even larger bore section 50, and the largest bore section 52, which extends from bore section 50 to bore end 38. Bore section 52 is internally threaded to receive a proportioner support member formed as a head nut 54. Nut 54 has a tool-receiving head section 56 and a shank section 58. A portion of the shank section has external threads 60 thereon which are threaded into the bore section 52 when the modular proportioner is assembled into housing 25. Nut shank section 58 also has a cylinder 62 formed therethrough and opening into bore 36. The forward end 64 of the cylinder 62 has a fluid passage 66 therethrough which opens into an outlet 68 to which the rear brake outlet conduit 34 is sealingly connected. A vent seal 70 is provided between the nut shank section 58 and the bore end 38 to prevent the entry of dirt while permitting venting of the inner portion of the largest bore section 52 to the atmosphere between the threads of the shank section and bore section. A passage formed by an axially extending interruption of threads 60 may be provided to increase venting action.

A proportioner piston 72 is formed to include a land 74, adjacent one end, and a smaller diameter body 76 extending from one side of the land 74. A bore 78 is provided through piston 72. A raised stop 80 on the other side of land 74 from the body 76 is arranged to engage the cylinder end 64 so that the major portion of the land end surface facing that cylinder end cannot at any time contact the cylinder end and appreciably diminish the effective area of the land in the chamber 82 formed in cylinder 62 by the land 74 and the cylinder end 64. The proportioner piston 72 is reciprocably received within cylinder 62 to permit this arrangement. A seal 84 on the outer circumference of land 74 sealingly engages cylinder 62 to prevent pressure leakage from chamber 82 to the vent annular chamber 86 on the other side of land 74, chamber 86 being defined by body 76 and cylinder 62.

A proportioner seat member 88 has a center land 90 received in bore section 50 and sealed relative to that bore section and shoulder 48 by seal 92 when assembly 24 is installed. The seat member 88 has a seat extension 94 extending into the open end of cylinder 62. Grooves 96 and 98, respectively formed in seat member 88 and the nut shank section 58, are so aligned so as to receive retainer ring 100 and hold the seat member 88 in place when the modular assembly 24 is being assembled. A proportioner spring 102 fits in vented chamber 86 with one spring end 104 abutting land 74 and the other spring end 106 abutting the end of seat extension 94. This spring is maintained under compression preload and continually urges the proportioner piston 72 axially away from the proportioner seat member 88. Retainer ring 100 prevents these elements from becoming disassembled unless a considerably greater force is applied so as to cam ring 100 inwardly. Spring 102 is so designed that it does not exert sufficient force for this purpose. Nevertheless, this permits disassembly of the modular assembly 24 when necessary. Groove 98 may have one side thereof slightly inclined to facilitate this operation.

The seat member 88 has another extension 108 extending in the opposite direction from extension 94 and on the other side of land 90 from that extension. Extension 108 has a first diameter 110 fitting within bore section 46 and a smaller diameter portion extending through a portion of bore section 46 and into but radially spaced from a portion of bore section 44. The recess 114, formed through seat member extension 94 and land 90 to receive the piston end 116 of the proportioner piston 72, is connected by passage 118 with the portion of bore section 46 into which port 32 opens. The recess base 120 of recess 114 has a passage 122 extending axially therethrough. The portion of base 120 facing proportioner piston end 116 forms a valve seat 124 which cooperates with the valve element 126 provided by piston end 116 to define therewith the proportioner valve. The seat member extension 108 has a recess 128 formed therein and opening into bore section 44, with the base passage 122 communicating recess 114 with the inner end of recess 128 through the proportioner valve. A seal 130 adjacent proportioner piston end 116 seals that smaller piston end relative to recess 114 while permitting axial movement of the proportioner piston 72 relative to the seat member 88.

The pressure unbalance sensing piston 132 is the shuttle piston which actuates a pressure failure warning circuit. It includes switch actuating cam surfaces 134 and 136 positioned generally centrally of the piston and received in bore section 42. One end of the piston extends into bore section 40 and has a land 138 provided thereon, with a seal 140, so that the piston is sealingly and reciprocably supported at that end by bore section 40. A reduced diameter extension 142 forming the extreme end of piston 132 adjacent land 138 provides a stop for the piston in its direction of movement toward the end 144 of bore 36 so that land 138 cannot close port 28. The chamber 146 is defined by bore end 144 and piston land 138 in bore section 40. This is the chamber through which port 28 passes.

Piston 132 has another land 148, on the other side of the cam surface 134 and 136 from land 138, which is reciprocably received in bore section 42. A shoulder 150 formed at the junction of bore sections 42 and 44 is normally aligned with one side of land 148 so that a sleeve 152, received about a reduced diameter section 154 of piston 132 adjacent land 148, axially engages both shoulder 150 and the side of land 148. Sleeve 152 is slidable on section 154 and in bore section 44. A sealing ring 156, preferably an O-ring, fits about piston section 154 and also engages bore section 44 to seal against both of those sections. It is also slidably movable relative to either section. The extreme end 158 of piston section 154 extends into recess 128 of the seat member 88 and has a lip or V-block seal 160 which prevents leakage to recess 128 from the annular chamber 162 formed about sensing piston extension 154 in bore section 44. Chamber 162 is closed by sealing ring 156 at one end and is open to port 32 at the other end.

The proportioner seat retainer ring 100 holds the proportioner seat member 88 in position in the head nut 54 against the force of the proportioner spring 102. This results in the proportioner piston 72 also being held within the head nut. The vent seal 70 is preassembled on the head nut. This preassembled unit can be pretested in a fixture and then provided as an aftermarket service part, as well as being provided on a production line basis for initial assembly in housing 26. Since some vehicles do not require rear brake proportioning action, the assembly can be made without use of the proportioner piston 72 and proportioner spring 102. This only requires that a seal be provided at the end of the head nut shank section 58 radially adjacent the land 90 of the seat member 88. The assembly made in this manner will permit the failure warning switch system to continue to operate.

During normal brake apply operation, sensing piston 132 is maintained in the position illustrated in FIG. 1 due to the balance of forces resulting from front brake pressure acting on one end of the piston across the effective area of land 138, unproportioned rear brake pressure acting in the opposite direction on the effective area of sleeve 152 to hold that sleeve against shoulder 150 and to resist a portion of the force generated by the front brake pressure, and the force generated by rear brake pressure, which may or may not be proportioned, acting on the effective area of piston end 158. It is noted that the three areas acted on by brake pressures are such that piston end 158 provides the smallest area, land 138 provides an intermediate area, and the area of sleeve 152, when added to the area of piston end 158, provides a total area greater than that of land 138. This arrangement permits the piston to move from the center position only when there is sufficient pressure unbalance between front and rear brake pressures to warrant the actuation of the failure warning circuit by means of the switch assembly 164. The general operation of this type of signal mechanism, as well as the general operation of the proportioner mechanism, is disclosed in U.S. Pat. No. 3,733,106, entitled "Combination Valve Assembly With Proportioner Override", and issued May 15, 1973, to the common assignee. Due to the arrangement provided, the piston 132 will move toward the chamber containing the lower pressure caused by a leak or failure, and will remain in that position until the system has been repaired. When the brake system is then hydraulically actuated, the piston will be returned to its center position, deactivating the warning circuit through switch assembly 164. As shown in greater detail in the above noted patent, the switch assembly 164 has a plunger which is actuable by the cam surfaces 134 and 136 when the piston shifts to and from a failure mode.

When the rear brake system loses pressure, the piston 132 moves toward the proportioner seat member 88 until it bottoms out on the recess base 120. When a front brake system failure occurs, piston 132 moves rightwardly as seen in FIG. 1 until its end 142 bottoms out against bore end 144. Sufficient movement occurs in this instance so that the sensing piston proportioner seal 160 moves out of the bore formed by recess 128, permitting full line pressure to flow to the rear brakes regardless of the proportioner action. This flow occurs through port 32, chamber 162, recess 128, and base passage 122. When the piston 132 is reset, seal 160 is forced into recess 128 again and the unit is ready for normal operation.

During normal braking operation the front brake pressure generated in one pressurizing chamber of the master cylinder passes through port 28 and to the front brakes through conduit 30. Since port 28 opens into chamber 146 this pressure also acts against one end of piston 132. Rear brake pressure generated in the other pressurizing chamber of the master cylinder enters assembly 24 through port 32 and is delivered to chamber 162 and passage 118. The fluid in chamber 162 acts on ring 156 and sleeve 152, urging them rightwardly as seen in FIG. 1 and as described above. The pressure passes through passage 118, enters recess 114 and goes through the proportioning valve formed by valve element 126 and valve seat 124. It then enters passage 122 and recess 128 to act on the end 158 of piston 132. It also goes through bore 78, chamber 82 and passage 66 to outlet 68 and the rear brake fluid outlet conduit 34. As the master cylinder pressures increase, the pressure builds up in chamber 82 so that the force opposing proportioner spring 102 and generated by this pressure acting across the effective area of land 74 eventually overcomes the preload of spring 102 and the force generated by the pressure acting across proportioner piston end 116. Until this point is reached, full master cylinder pressure is delivered to the rear brakes. When the force overcomes the proportioner spring preload, proportioner piston 72 moves rightwardly and the valve member 126 seats on valve seat 124. At this point the rear brake pressure delivered to the rear brakes is limited to the pressure occurring at the time the proportioner valve closed. Pressure from the master cylinder continues to act on a small portion of the piston end 116 exposed to the portion of recess 114 connected to passage 118. As this pressure increases, the proportioning piston 72 is moved slightly leftward, causing the valve formed by valve member 126 and valve seat 124 to proportion fluid pressure in accordance with the effective areas of the proportioner piston.

When the master cylinder is released and the pressure delivered by it decreases toward zero, the proportioner piston 72 will try to seat with increasing force as the pressure differential increases due to reduction in pressure in recess 114. The same differential pressure acts across the end 158 of piston 132. Since seal 160 is a lip or V-block type of seal and seals only in the direction from chamber 162 toward recess 128, flow is allowed past the seal in the non-sealing direction. The higher fluid pressure in recess 128 deflects the seal lip and relieves the rear brake pressure past that seal and through chamber 162 to port 32 until the pressure proportioning point is reached. At this time the proportioner spring 102 overcomes the force generated by the pressure acting on piston land 74 and the piston 72 moves leftwardly to open the proportioner valve. The rear brake actuating pressure is then relieved through the proportioner valve past valve elements 124 and 126.

What is claimed is:

1. A brake pressure proportioner valve assembly adapted for removal and replacement in a housing as a preassembled unit, said assembly comprising:

a proportioner support first member having a pressure outlet and means for attaching and removing said assembly relative to a housing, a proportioner piston preassembled in said first member and having a proportioner valve element formed thereon and having differential areas responsive to brake fluid pressures for proportioning action, a proportioner valve seat second member secured to and preassembled with said first member and having a proportioner valve seat formed thereon for coaction with said proportioner valve element to provide a proportioner valve, a spring acting on said second member and the proportioner piston and in said first member to continually urge said members in opposite directions toward opening of said proportioner valve;

and a brake pressure inlet passage formed in said second member and adapted to receive brake pressure to be proportioned, said inlet passage being in continuous fluid communication with one side of said proportioner valve and with the smaller of said proportioner piston differential areas, said first member pressure outlet being in continuous fluid communication with the other side of said proportioner valve and the larger of said proportioner piston differential areas, whereby brake pressure above a predetermined value in said inlet passage is proportioned to a lesser value at said pressure outlet.

2. A brake pressure proportioner valve assembly adapted for removal and replacement in a housing as a preassembled unit, said assembly comprising:

a head nut having a tool-receiving head section and a shank section with external threads formed on said shank section for removably securing said assembly in a housing, a recess in said shank section forming a cylinder open at one end and provided with a fluid passage at the other end extending through said head section and adapted to be connected to a brake fluid outlet conduit;

a proportioner piston reciprocably received in said cylinder and having a body with a bore therethrough, a land on said body at the piston end thereof toward said fluid passage, said land having an external seal slidably engaging said cylinder in sealing relation;

a proportioner seat member having a centraly positioned land, a reduced diameter first extension received in the open end of said cylinder and having a recess therein slidably and sealingly receiving the other end of said proportioner piston body, means coacting between said first extension and said head nut shank section retaining said seat member in the open end of said cylinder with said centrally positioned land being in abuttable relation to said shank section;

a compression coil spring in said cylinder about said piston body and having one end grounded on said seat member first extension and the other end on said piston land to continually urge said piston and said seat member apart, said spring being in an annular vented chamber defined by said piston and said seat member and the wall of said cylinder;

the base of said seat member recess having a passage therethrough with one end thereof forming a valve seat cooperating with said piston body at the end of said piston bore to define a proportioning valve;

said seat member having a reduced diameter second extension extending from said centrally positioned land in the opposite direction from said first extension, said second extension having a recess therein with the base thereof having said valve seat passage opening therethrough;

and a brake fluid receiving passage communicating with said seat member first extension recess at one end and opening radially outward of said reduced diameter second extension at the other end for receiving pressurized brake fluid from a pressurizing device, said second reduced diameter extension recess being adapted to receive a pressure unbalance sensing piston with one of the pressures being in the second extension recess.

* * * * *

UNITED STATES PATENT AND TRADEMARK OFFICE
CERTIFICATE OF CORRECTION

PATENT NO. : 3,964,795
DATED : June 22, 1976
INVENTOR(S) : Thomas P. Mathues

It is certified that error appears in the above-identified patent and that said Letters Patent are hereby corrected as shown below:

Title page, references cited, PN 3,637,963, the class "303/6 C" should read 303/6 CX;

PN 3,686,864, the class "303/6 C" should read 303/6 CX.

Column 2, line 20, "25" should read 26.

Column 3, line 45, "surface" should read surfaces.

Column 5, line 68, delete "and".

Column 6, line 32, "centraly" should read centrally.

Signed and Sealed this

Seventh Day of September 1976

[SEAL]

Attest:

RUTH C. MASON
Attesting Officer

C. MARSHALL DANN
Commissioner of Patents and Trademarks